United States Patent
Lemoine et al.

(10) Patent No.: US 10,536,889 B2
(45) Date of Patent: Jan. 14, 2020

(54) HYBRID RESIDENTIAL GATEWAY

(71) Applicant: ORANGE, Paris (FR)

(72) Inventors: Benoit Lemoine, Ploubezre (FR);
Jean-Yves Cloarec, Lannion (FR);
Gurvan Moal, Tredrez Locquemeau (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/770,389

(22) PCT Filed: Oct. 21, 2016

(86) PCT No.: PCT/FR2016/052742
§ 371 (c)(1),
(2) Date: Apr. 23, 2018

(87) PCT Pub. No.: WO2017/068302
PCT Pub. Date: Apr. 27, 2017

(65) Prior Publication Data
US 2018/0317151 A1    Nov. 1, 2018

(30) Foreign Application Priority Data

Oct. 22, 2015   (FR) ...................................... 15 60096

(51) Int. Cl.
*H04W 36/30* (2009.01)
*H04W 36/00* (2009.01)
(Continued)

(52) U.S. Cl.
CPC ....... *H04W 36/30* (2013.01); *H04W 36/0061* (2013.01); *H04W 60/005* (2013.01);
(Continued)

(58) Field of Classification Search
CPC . H04W 76/11; H04W 36/0061; H04W 36/30; H04W 76/15; H04W 60/005;
(Continued)

(56) References Cited

U.S. PATENT DOCUMENTS

| 2010/0080172 A1* | 4/2010 | Jin ...................... H04W 60/005 370/328 |
| 2013/0237234 A1* | 9/2013 | Jiao ........................ H04W 24/02 455/444 |

(Continued)

OTHER PUBLICATIONS

Written Opinion of the International Searching Authority dated Feb. 2, 2017 for corresponding International Application No. PCT/FR2016/052742, filed Oct. 21, 2016.
(Continued)

*Primary Examiner* — Brian D Nguyen
(74) *Attorney, Agent, or Firm* — David D. Brush; Westman, Champlin & Koehler, P.A.

(57) ABSTRACT

A method for delegating a request to establish a new connection between a cellular terminal and an anchor gateway. The cellular terminal is attached, via a first link, to a local base station including an interface with a packet switching network. A first connection is established between the terminal and the anchor gateway. An IP address is assigned to the terminal by the anchor gateway, the first connection using the IP address and the first link. The local base station: receives the request, including an indication of necessary resources; decides not to establish the new connection using the local base station based on the indication; selects an adjacent base station based on quality measurements obtained from radio signal(s) transmitted by adjacent base station(s) to the terminal; and transmits a configuration message to the terminal requesting attachment of the terminal to the selected adjacent base station via a second link.

15 Claims, 4 Drawing Sheets

Figure 2:
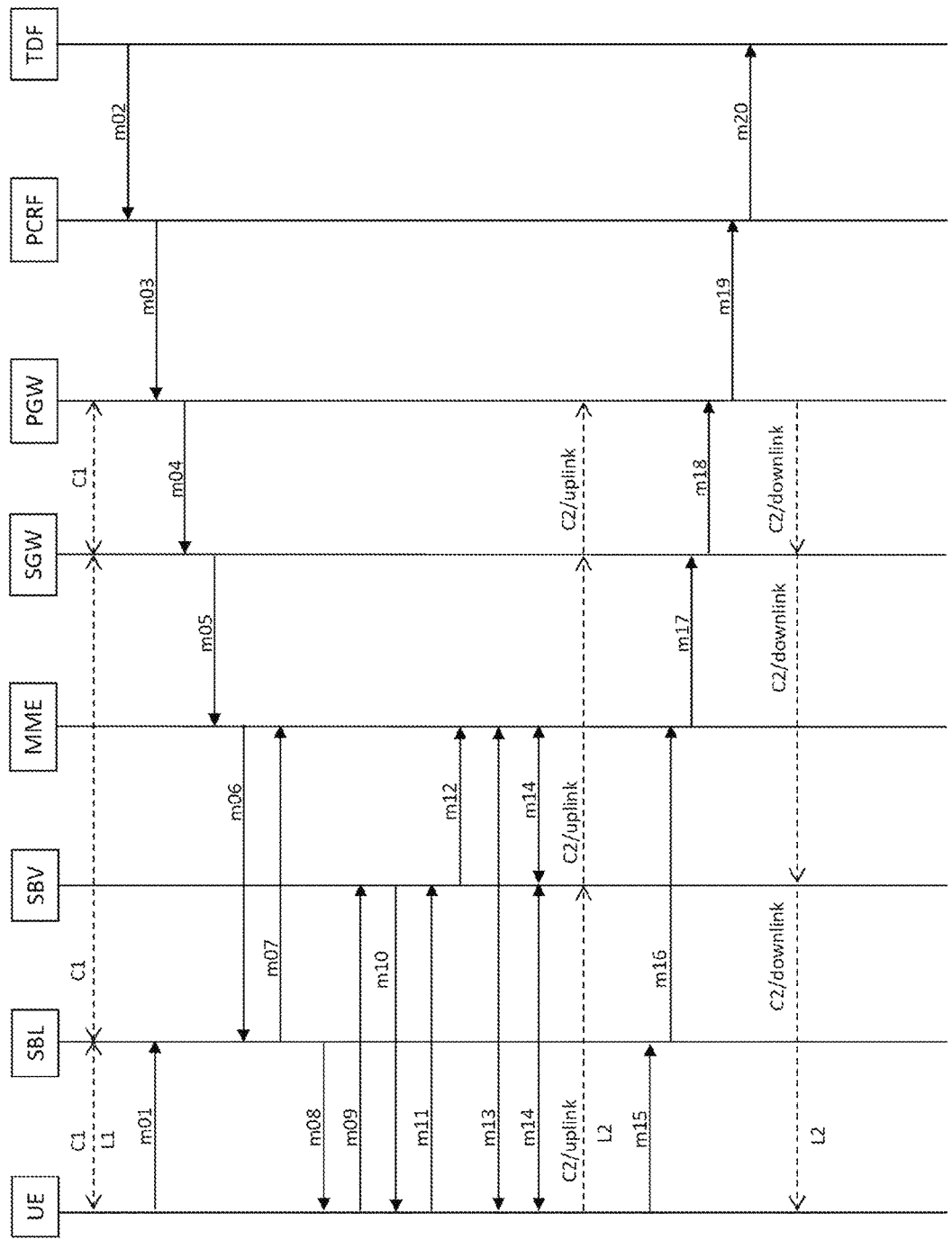

(51) Int. Cl.
*H04W 76/11* (2018.01)
*H04W 60/00* (2009.01)
*H04W 76/15* (2018.01)
H04W 84/04 (2009.01)
H04W 88/16 (2009.01)
H04L 29/12 (2006.01)

(52) U.S. Cl.
CPC ............ *H04W 76/11* (2018.02); *H04W 76/15* (2018.02); *H04L 61/2007* (2013.01); *H04W 36/0072* (2013.01); *H04W 84/045* (2013.01); *H04W 88/16* (2013.01)

(58) Field of Classification Search
CPC ........... H04W 36/0072; H04W 84/045; H04W 88/16; H04L 61/2007
See application file for complete search history.

(56) References Cited

U.S. PATENT DOCUMENTS

| | | | |
|---|---|---|---|
| 2014/0355536 A1 | 12/2014 | Muley et al. | |
| 2015/0146688 A1* | 5/2015 | Yasuda | H04W 36/0005 370/331 |
| 2015/0341187 A1* | 11/2015 | Diwane | H04L 49/35 370/401 |
| 2019/0053135 A1* | 2/2019 | Hahn | H04W 76/11 |

OTHER PUBLICATIONS

International Search Report dated Feb. 2, 2017 for corresponding International Application No. PCT/FR2016/052742, filed Oct. 21, 2016.

"Updates to the WID about NBIFOM in order to support the Hybrid access of a RGW", 3rd Generation Partnership Project. Jul. 2, 2014. ETSI TR 136 932, v12.1.0 (Oct. 2014), LTE; "Scenarios and requirements for small cell enhancements for E-UTRA and E-UTRAN (3GPP TR 36.932 version 12.1.0 Release 12)".

3GPP document TS 23.401, V13.4.0 (Sep. 2015), 3rd Generation Partnership Project; Technical Specification Group Services and System Aspects; General Packet Radio Service (GPRS) enhancements for Evolved Universal Terrestrial Radio Access Network (E-UTRAN) access (Release 13).

3GPP document TS 36.331, v12.7.0 (Sep. 2015) 3rd Generation Partnership Project; Technical Specification Group Radio Access Network; Evolved Universal Terrestrial Radio Access (E-UTRA); Radio Resource Control (RRC); Protocol specification (Release 12).

\* cited by examiner

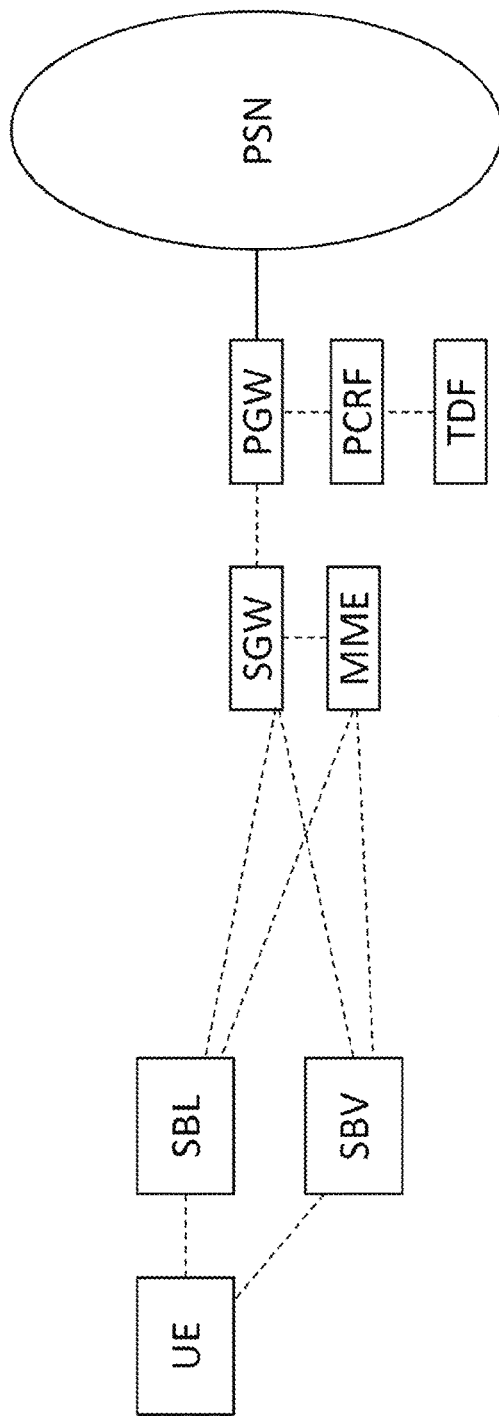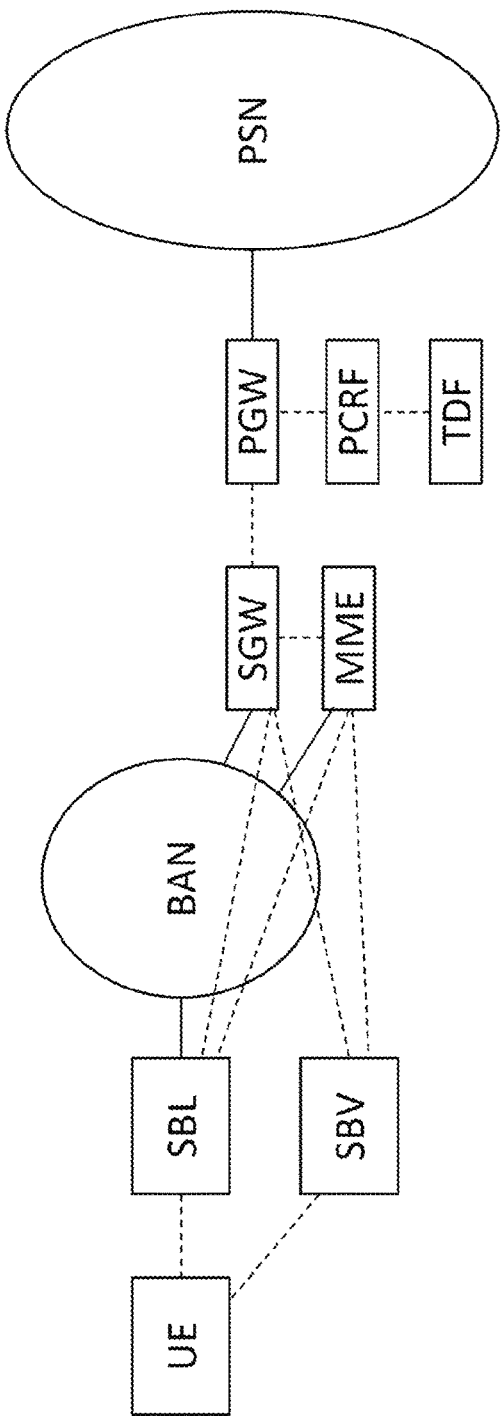

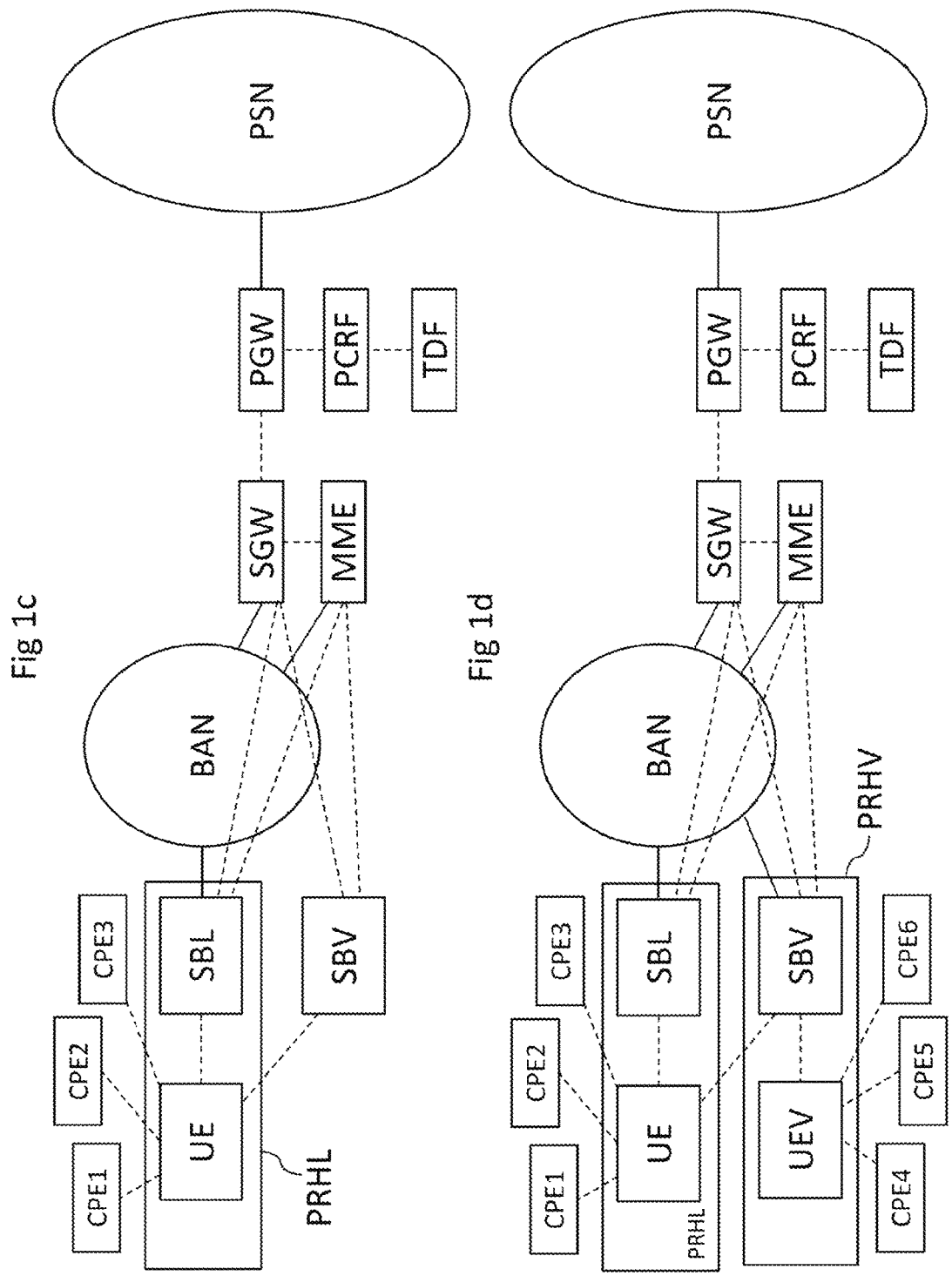

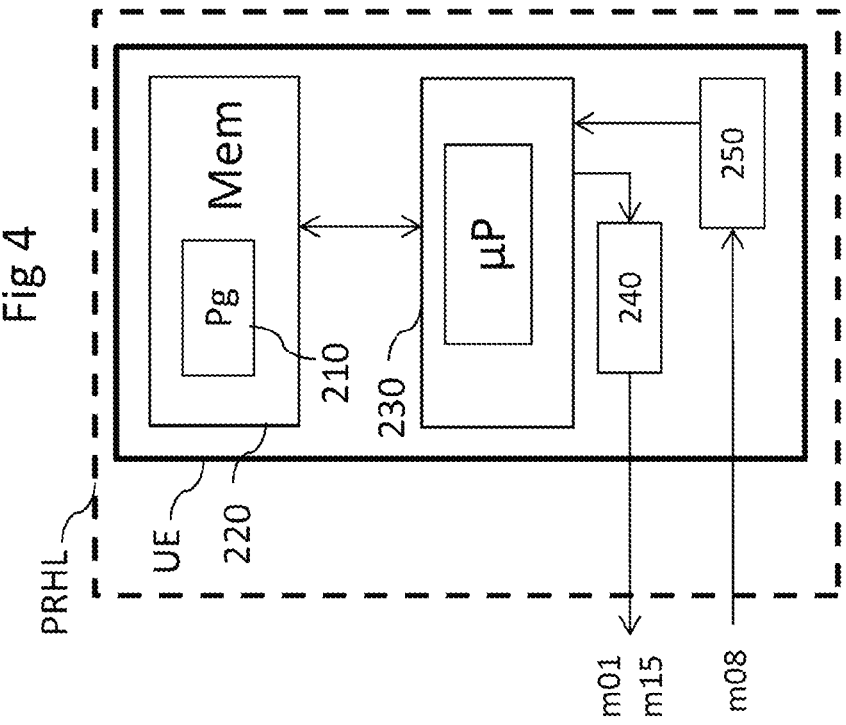
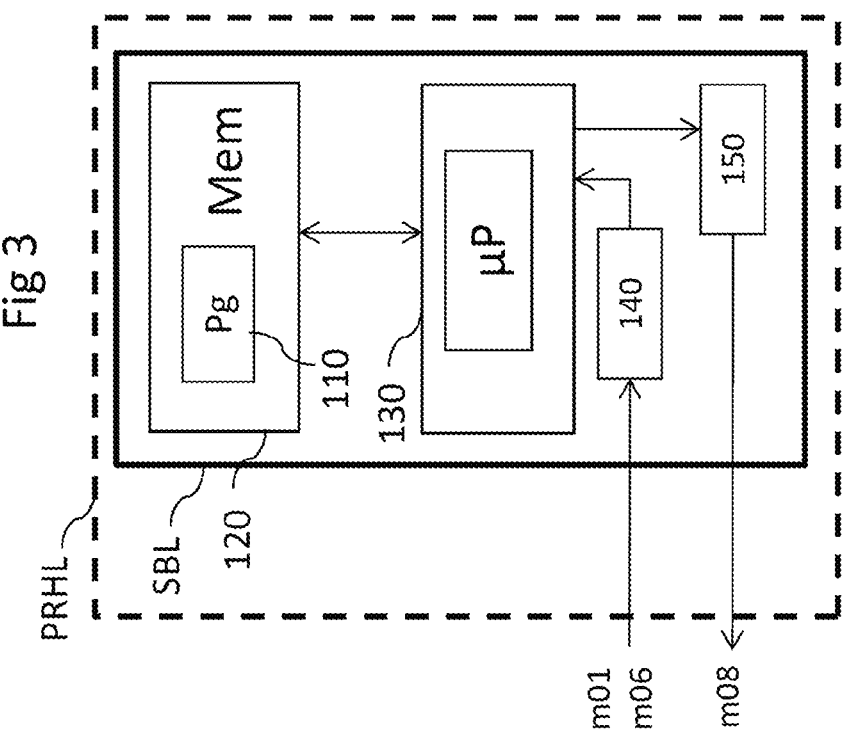

HYBRID RESIDENTIAL GATEWAY

CROSS-REFERENCE TO RELATED APPLICATIONS

This Application is a Section 371 National Stage Application of International Application No. PCT/FR2016/052742, filed Oct. 21, 2016, which is incorporated by reference in its entirety and published as WO 2017/068302 A1 on Apr. 27, 2017, not in English.

1. FIELD OF THE INVENTION

The application for invention lies in the field of connections between a cellular terminal and a packet switching network, the cellular terminal being able to be for example a smartphone or a hybrid residential gateway, fixed and mobile.

2. PRIOR ART

Faced with the explosion in the bitrates consumed by the terminals connected to the local or the residential networks, and the insufficiency of bandwidth of fixed links, in particular xDSL or FTTH, between the residential gateways and the broadband access network, a solution has been to add to certain, so-called hybrid, gateways, the possibility of connecting to the mobile access network through a radio link. Stated otherwise, these hybrid gateways possess a mobile terminal functionality allowing them to attach to a base station of the mobile backhaul network. When the bitrate required by the terminals of the local network served by the residential gateway exceeds the capacity of its fixed link with the broadband access network, such a hybrid gateway redirects part of its traffic onto its radio link.

The hybrid residential gateways according to the prior art exhibit the drawback of overloading the radio links of the surrounding base stations as well as the mobile backhaul network.

One of the aims of the invention is to remedy these drawbacks of the prior art.

3. DISCLOSURE OF THE INVENTION

The invention improves the situation with the aid of a method for delegating a request to establish a new connection between a terminal adapted to connect to a cellular network, so-called cellular terminal, and a so-called anchor gateway comprising an interface with a packet switching network, the cellular terminal being attached by a first link to a local base station, a first connection being established between the cellular terminal and the anchor gateway, an IP address being allocated to the cellular terminal by the anchor gateway, the first connection using the IP address and the first link, the method being implemented in the local base station and comprising the following steps:

obtaining of measurements of quality of a radio signal transmitted by at least one neighbor base station toward the cellular terminal, reception of a request for establishment of a new connection between the cellular terminal and the anchor gateway, generated by the anchor gateway and comprising an indication of necessary resources, decision not to establish the new connection through the local base station, on the basis of the indication of necessary resources, the method furthermore comprising the following steps:

selection of a neighbor base station as a function of the quality measurements obtained, transmission of a configuration message destined for the cellular terminal comprising an identifier of the selected neighbor base station, the configuration message requesting the attachment of the cellular terminal to the selected neighbor base station, by a second link, the attachment triggering the creation of the new connection between the cellular terminal and the anchor gateway through the selected neighbor base station, the new connection using the IP address and the second link, the first connection and the first link being maintained.

If, for any reason, it is not possible for the local base station to support a new connection between the cellular terminal and the anchor gateway while keeping the existing connection intact, by virtue of the invention this new connection is established through a neighbor base station, doing so without a new IP address being allocated to the cellular terminal by the anchor gateway. According to the prior art, on the contrary, when a cellular terminal attached to a local base station asks to attach to a neighbor base station, the new connection cannot share the same IP address with the previous connection.

Moreover, by virtue of the invention better use is made of the resources of the cellular network since the load in terms of bitrate of a cellular terminal is distributed over several base stations.

Hence, it is more advantageous to keep the same IP address for one and the same cellular terminal simultaneously using different links to several base stations, since in this way the distribution of the streams does not have any impact on the IP network, and therefore does not generate any additional signaling between the terminal and the IP hosts. Implementations for such a sharing of an IP address have been presented to the 3GPP for example in document TR 36.932.

According to one aspect of the invention, the delegation method furthermore comprises a step of transmitting a response message comprising an information item relating to the delegation of the establishment of the new connection to a neighbor base station.

By virtue of this aspect, the management device that transmitted the establishment request message can place itself on standby awaiting a petition not of the local base station but of another base station. Advantageously, the response message can comprise an identifier of this other base station, and advantageously, the identifier is that of the selected neighbor base station.

According to one aspect of the invention, the delegation method furthermore comprises a step of receiving a response message originating from the cellular terminal confirming the establishment of the new connection through the selected neighbor base station.

By virtue of this aspect, the management device that transmitted the establishment request message can receive the expected response on the part of the local base station, even if it is not through this base station that the new connection is established, and can thus warn the anchor gateway so that the establishment of the new connection is done in both directions of transmission.

According to one aspect of the invention, the decision step comprises a step of comparing a bitrate necessary for the new connection with a bitrate available through the local base station, the indication of necessary resources, which is included in the request for establishment of a new connection, comprising an information item relating to the necessary bitrate.

The reason for the decision can be an insufficiency of bitrate available through the local base station to support the traffic of the new connection, in addition to that of the existing connection. By virtue of the information regarding bitrate necessary for the new connection, the local base station can decide between establishing the new connection according to the prior art, if its available bitrate so allows, or of not doing so, thereby triggering the establishment of the new connection through a neighbor base station.

According to one aspect of the invention, the configuration message comprises the indication of necessary resources.

By virtue of this aspect, the cellular terminal can inform the neighbor base station of the bitrate necessary for the new connection, thereby allowing the latter to verify whether it has this bitrate itself.

According to one aspect of the invention, the first link is a radio link emulated on a physical hookup between the cellular terminal and the local base station.

By virtue of this aspect, the cellular terminal and the local base station can be integrated into one and the same device. The physical hookup between the cellular terminal and the local base station is for example a metallic or optical connection. The bitrate available for a new connection is therefore no longer limited by the capacity of a conventional radio link. The bitrate available for a new connection will in fact be limited by the capacity of the link between the local base station and the access network serving the cellular network, which is in general less than that of a metallic or optical hookup, but greater than that of a conventional, non-emulated, radio link.

This advantage is multiplied when there exists a plurality of neighbor base stations configured in this manner, that is to say each having their cellular terminal connected by a radio link emulated on a physical hookup. Thus, each of these cellular terminals can count on a neighbor base station to carry part of its traffic when its (local) base station has reached its bitrate limit, without having to establish a new IP connection with its anchor gateway.

According to one aspect of the invention, the local base station is connected to a broad-band fixed access network.

By virtue of this aspect, the resources of the cellular network, which are already made better use of by virtue of the invention, are increased since the bandwidth, per user, of the broad-band fixed access network is greater than that, per user, of the cellular networks. Therefore, the mobile backhaul network can be relieved of part of the traffic passing through the fixed access network.

According to one aspect of the invention, the cellular terminal is able to connect to terminal devices forming a local access network, the devices of the local access network being able to exchange data packets with devices of the packet switching network, through the first link and through the second link.

By virtue of this aspect, the assembly made up of the cellular terminal and the local base station possesses a residential gateway function, that is to say that it allows, by Ethernet or Wi-Fi connections, the connection of terminal devices such as for example a computer, a tablet, and a printer, at one and the same time between one another and with the packet switching network, which is for example the Internet.

Such a residential gateway, consisting of a cellular terminal and of a local base station according to the invention, exhibits the advantage of making better use of the resources of the access network in terms of bandwidth toward the base stations.

This advantage is multiplied in an access network where the residential gateways of this type are sufficiently numerous and close together, such as in an urban area, since any residential gateway of this type can connect to another of the same type and use at least part of its available bandwidth toward the access network, thus allowing better distribution of the total load of a cellular terminal over several residential gateways.

The various aspects of the delegation method which have just been described can be implemented independently of one another or in combination with one another.

The invention also relates to a method for processing a delegated request to establish a new connection between a terminal adapted to connect to a cellular network, so-called cellular terminal, and a so-called anchor gateway comprising an interface with a packet switching network, the cellular terminal being attached by a first link to a local base station, a first connection being established between the cellular terminal and the anchor gateway, an IP address being allocated to the cellular terminal by the anchor gateway, the first connection using the IP address and the first link, the method being implemented in the cellular terminal and comprising the following steps:

transmission destined for the local base station of measurements of quality of a radio signal transmitted by at least one neighbor base station toward the cellular terminal, reception of a configuration message comprising an identifier of one of the at least one neighbor base station, the configuration message requesting the attachment of the cellular terminal to the neighbor base station, by a second link, the attachment triggering the creation of the new connection between the cellular terminal and the anchor gateway through the neighbor base station, the new connection using the IP address and the second link, the first connection and the first link being maintained, transmission destined for the local base station of a response message comprising an information item relating to the establishment of the new connection through the neighbor base station, comprising the identifier of the neighbor base station.

Such a method allows a cellular terminal to attach to two base stations, on the initiative of one of the two base stations.

The invention further relates to a local base station able to delegate a request to establish a new connection between a terminal adapted to connect to a cellular network, so-called cellular terminal, and a so-called anchor gateway comprising an interface with a packet switching network, the cellular terminal being attached by a first link to the local base station, a first connection being established between the cellular terminal and the anchor gateway, an IP address being allocated to the cellular terminal by the anchor gateway, the first connection using the IP address and the first link, the local base station comprising a receiver, a processor and a transmitter:

the receiver being able to obtain measurements of quality of a radio signal transmitted by at least one neighbor base station toward the cellular terminal, and able to receive a request to establish a new connection between the cellular terminal and the anchor gateway, generated by the anchor gateway and comprising an indication of necessary resources, the processor being able to decide not to establish the new connection through the apparatus, on the basis of the indication of necessary resources, and able to select a neighbor base station as a function of the quality measurements obtained, the transmitter being able to transmit a configuration message destined for the cellular terminal comprising an identifier of the selected neighbor base station, the configuration message requesting the attachment of the cellular terminal to the selected neighbor base station, by a second link, the attachment triggering the creation of the new connection between the cellular terminal and the anchor gateway through the selected neighbor base station, the new connection using the IP address and the second link, the first connection and the first link being maintained.

This local base station according to the invention is able to implement in all its embodiments the method which has just been described for delegating a request to establish a new connection.

The invention also relates to a cellular terminal adapted to connect to a cellular network and able to process a delegated request to establish a new connection between the cellular terminal and a so-called anchor gateway comprising an interface with a packet switching network, the cellular terminal being attached by a first link to a local base station, a first connection being established between the cellular terminal and the anchor gateway, an IP address being allocated to the cellular terminal by the anchor gateway, the first connection using the IP address and the first link, the cellular terminal comprising a transmitter and a receiver:

the transmitter being able to transmit destined for the local base station measurements of quality of a radio signal transmitted by at least one neighbor base station toward the cellular terminal, the receiver being able to receive a configuration message comprising an identifier of one of the at least one neighbor base station, the configuration message requesting the attachment of the cellular terminal to the neighbor base station, by a second link, the attachment triggering the creation of the new connection between the cellular terminal and the anchor gateway through the neighbor base station, the new connection using the IP address and the second link, the first connection and the first link being maintained, the transmitter being able to transmit destined for the local base station a response message comprising an information item relating to the establishment of the new connection through the neighbor base station, comprising the identifier of the neighbor base station.

This cellular terminal according to the invention is able to implement in all its embodiments the method which has just been described for processing a delegated request to establish a new connection.

The invention relates furthermore to a hybrid residential gateway comprising a local base station such as that which has just been described, and a cellular terminal such as that which has just been described, the cellular terminal being attached to the local base station by a radioelectric link emulated on a physical hookup, the local base station being connected to a broad-band fixed access network.

When the cellular terminal according to the invention and the local base station according to the invention are united into a single item of equipment connected to the broadband access network, this item of equipment may not only be used as a residential gateway but as a residential gateway benefiting in addition from the connection to a base station of the neighborhood.

It is understood that it is very advantageous to deploy in one and the same residential area a plurality of hybrid residential gateways according to the invention. Indeed, from the point of view of the subscriber, customer or user that uses such a hybrid gateway, it retains all the functionalities of a conventional residential gateway, except that its bitrate actually available is greater than the bitrate available on its sole hybrid gateway. The traffic brought about by a new connection, that the subscriber's hybrid gateway cannot carry, can therefore pass through a neighboring hybrid gateway. The radio resources of the conventional base stations in the same area of coverage are therefore safeguarded.

The bitrate of the connection to the broadband access network of the neighboring hybrid gateway being available, the total bitrate available for the subscriber can thus be doubled.

According to one aspect of the hybrid residential gateway according to the invention, the cellular terminal is able to connect to terminal devices forming a local access network, the devices of the local access network being able to exchange data packets with devices of the packet switching network, through the first and second links.

This hybrid residential gateway according to the invention allows any customer device which is connected to it to increase its available bitrate, indeed to double it.

According to one aspect of the hybrid residential gateway according to the invention, the local base station is of femtocell type.

By virtue of this aspect, it is easy to integrate the base station into a residential gateway. Indeed, femtocells, known by the term HNodeB or HeNodeB in 3GPP terminology, are specially designed to cover a reduced area and require little power with respect to a conventional cell (NodeB or eNodeB in 3GPP terminology), to which it is complementary.

It is understood that by virtue of its characteristics the invention also provides an emergency solution to a subscriber in case of interruption of his connection to the broad-band fixed access network, since he can subsidiarily use the cellular interface of his hybrid gateway to a conventional base station to place a voice call or open an Internet session.

The invention also relates to a computer program comprising instructions for the implementation of the steps of the delegation method which has just been described, when this method is executed by a processor.

The invention relates moreover to a computer program comprising instructions for the implementation of the steps of the processing method which has just been described, when this method is executed by a processor.

These programs can use any programming language, and be in the form of source code, object code, or of code intermediate between source code and object code, such as in a partially compiled form, or in any other desirable form.

The invention also envisages an information medium readable by a computer, and comprising computer program instructions such as mentioned hereinabove.

The information medium can be any entity or apparatus capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be conveyed via an electrical or optical cable, by radio or by other means. The program according to the invention can in particular be downloaded from a network of Internet type.

Alternatively, the information medium can be an integrated circuit in which the program is incorporated, the circuit being adapted to execute or to be used in the execution of the methods in question.

4. PRESENTATION OF THE FIGURES

Other advantages and characteristics of the invention will become more clearly apparent on reading the following description of a particular embodiment of the invention, given by way of simple illustrative and nonlimiting example, of the invention and of the appended drawings, from among which:

FIGS. 1a, 1b, 1c, 1d present in a schematic manner an overall view of the elements implementing the invention, according to four particular embodiments, FIG. 2 presents an exemplary implementation of the method for delegating a request to establish a new connection, and of the method for processing the delegated request, according to one aspect of the invention, FIG. 3 presents an exemplary structure of a local base station, according to one aspect of the invention, FIG. 4 presents an exemplary structure of a cellular terminal, according to one aspect of the invention.

5. DETAILED DESCRIPTION OF AT LEAST ONE EMBODIMENT OF THE INVENTION

In the subsequent description, examples are presented of several embodiments of the invention based on the standard 3GPP TS 23.401 version 13.4.0, itself based on several standards, including the standard 3GPP TS 36.331, but the invention also applies to the upgrades of these standards.

FIG. 1a presents in a schematic manner an overall view of the elements implementing the invention, according to a first embodiment.

The terminal UE has established a connection with an anchor gateway PGW through a local base station SBL to which it is attached by a radioelectric link, and optionally through one or more service gateways SGW. This connection allows the terminal UE to exchange data with at least one remote terminal of the packet switching network PSN to which the anchor gateway is connected, for example the Internet network. This remote terminal can be an SIP server, a VoIP terminal, a VoD server, etc, in this case this remote terminal will be called element AF (Application Function). It will be noted that an element TDF (Traffic Detection Function) can be disposed inside the network PSN between the anchor gateway PGW and the AF elements, so as to allow the detection of particular communication streams between the terminal UE and the AF elements.

According to the invention, the terminal UE also attaches to another base station SBV, selected from among a plurality of neighbor base stations of the station SBL, so as to establish a new connection with the gateway PGW. The stations SBL and SBV are connected in a conventional manner to the diverse constituent elements of an LTE/EPC mobile network, such as the service gateway SGW, and a mobility management server MME. The anchor gateway PGW, also in a conventional manner, is connected to a management element PCRF whose role is to manage and apply the policies for management, by the operator of the LTE/EPC network, of the connections of mobile terminals, this element PCRF being connected to an element TDF or to an element AF. Thus, when the element TDF or the element AF identify that a data stream requires a specific bandwidth and/or a service quality through the mobile network, they can request the implementation of a new connection in parallel with the first so as to transport this data stream with a particular bandwidth management and/or service quality policy.

Not only is the initial connection via the station SBL maintained when the new connection via the station SBV is established, but the IP address allocated to the initial connection by the gateway PGW is reused for this new connection.

FIG. 1b presents in a schematic manner an overall view of the elements implementing the invention, according to a second embodiment.

In a second embodiment, the local base station SBL is connected to a broadband fixed access network, denoted BAN and managed by the same operator as the LTE/EPC network, or by another operator. The station SBL can thus be a terminal element of the broadband fixed access network xDSL or FTTH, and be located in the premises of a customer of this operator, and managed by the customer. Such a base station, called HNodeB or HeNodeB, is for example intended to serve a cell of small size, termed a femtocell, supplementing the imperfect coverage of a cell of larger size, termed a macrocell. A macrocell is served by a base station called NodeB or eNodeB, which is managed directly by the operator of the LTE/EPC network.

FIG. 1c presents in a schematic manner an overall view of the elements implementing the invention, according to a third embodiment.

In a third embodiment, the station SBL is a terminal element of the broadband fixed access network xDSL or FTTH, and is located in the premises of a customer of this operator, and is managed by the customer, as in the previous embodiment. On the other hand, in this third embodiment, the station SBL is integrated with the terminal UE to form one and the same so-called hybrid residential gateway PRHL, that is to say a residential gateway capable of connecting its local network to the packet switching network PSN, by fixed access and by cellular access. In this embodiment, the local access network of the residential gateway PRHL is deployed by the terminal UE, which comprises one or more interfaces, for example of Ethernet or Wi-Fi type, allowing devices of the customer, denoted CPE1, CPE2 and CPE3, such as for example a tablet or a printer, to connect to the terminal UE.

As in this embodiment the terminal UE is fixed and internal with respect to the station SBL, the radioelectric link between them can be emulated on a physical hookup between the elements constituting the hybrid residential gateway PRHL, thereby exhibiting the advantages on the one hand of reserving the frequencies of this link for another radioelectric link, and on the other hand of increasing the capacity of the link. As the radioelectric link is emulated, the elements of the cellular network such as the anchor gateway PGW consider that the terminal UE is connected according to the protocols provided for the cellular network, and no modification is necessary in these elements. Since the radioelectric frequencies are not used for the link between the terminal UE and the station SBL, they can be used for a radioelectric link between the terminal UE and a neighbor base station, such as SBV. As a single radioelectric link at a time is used, no problem of sharing and of coordination of the frequencies arises at the terminal UE, even if from the point of view of the cellular network the terminal UE is attached to two different base stations by two different radioelectric links.

FIG. 1d presents in a schematic manner an overall view of the elements implementing the invention, according to a fourth embodiment.

In this embodiment, not only is the station SBL included in a hybrid residential gateway PRHL according to the invention, such as the one just described, but the neighboring station SBV is also included in a hybrid residential gateway PRHV according to the invention. Like the residential gateway PRHL, the residential gateway PRHV comprises a terminal UEV able to deploy a local network allowing customer devices CPE4, CPE5 and CPE6 to connect to the terminal UEV, and the radioelectric link between the terminal UEV and the station SBV is emulated on a physical hookup.

An operator tailors his access network so as to carry the traffic of his subscribers (or customers, or users) in most situations, the traffic of each subscriber being different and irregular, with, in the two directions upgoing or downgoing, bitrate spikes, periods of lower but more regular mean bitrate, and periods of zero traffic. But there is the ever-present risk that a traffic spike at several subscribers simultaneously may bring about saturation of the broadband fixed access network, and cause degradation of the service quality.

It is understood that if an operator deploys a large number of hybrid residential gateways PRHL and PRHV according to the invention, the traffic of his subscribers can be better distributed, and the risk of saturation of the access network is decreased.

FIG. 2 presents an exemplary implementation of the method for delegating a request to establish a new connection, and of the method for processing the request delegated according to one aspect of the invention.

For the sake of clarity of the explanations and of simplicity of the figure, the nonlimiting assumption is made that the local base station SBL and the neighbor base station SBV both depend on the same anchor gateway PGW, on the same service gateway SGW and on the same mobility manager server MME.

According to known procedures performed prior to the execution of the method, the cellular terminal UE is attached to the station SBL by a first link L1, a first connection C1, known in the standard by the name "Default EPS Bearer" in the case where the terminal UE is attached to an "eNodeB" or else "Primary PDP Context" in the case where the terminal UE is attached to a "NodeB", is established between the terminal UE and the gateway PGW, and an IP address is allocated to the terminal UE by the gateway PGW for this connection C1. Hereinafter, we shall merely describe the procedures relating to the "Default EPS Bearer", but they may be transposed to the "Primary PDP Context".

The method for delegating a request to establish a new connection is implemented by the station SBL, and the method for processing the delegated request is implemented by the terminal UE.

In a known manner, the terminal UE transmits destined for the station SBL one or more messages, denoted m01, comprising measurements relating to the quality of radio signals between the terminal UE and one or more neighbor base stations of the station SBL as well as the neighbor base station identifiers associated with the measurements.

By virtue of these measurements m01, the station SBL is capable of selecting at any moment the neighbor base station SBV whose radio signal received by the terminal UE is the best.

Subsequent to a need corresponding to a service proposed by an element AF or to a stream detected by the element TDF, the gateway PGW receives via the management element PCRF (message m02) on which the former depends a request "IP CAN Session Modification" m03 for the terminal UE.

On the basis of this request, which indicates the resources necessary for this service, such as for example a bandwidth need and the characteristics of the IP streams concerned, the anchor gateway PGW generates a request to establish a new connection "Create Bearer Request" m04, which is relayed by the gateway SGW (message m05), and then by the server MME (message m06).

The characteristics of the IP streams concerned in the request are specified in the form of one or more descriptions TFT (Traffic Flow Template) describing the address or a range of source and/or destination IP addresses, port or range of TCP/UDP source and/or destination ports as well as DSCP field of the IP packets transported (it will be noted that all or some of these parameters will be able to be supplied).

This request to establish a new connection is translated by the server MME into a request "Bearer Setup Request/Session Management Request" m06, intended to establish a new connection C2, designated in the standard by the name "Dedicated EPS Bearer", which is under the dependency of the pre-existing "Default EPS Bearer". It will be noted that in the case of a pre-existing "Primary PDP Context", it is a "Secondary PDP Context" which will have to be established. The request m06 is transmitted destined for the station SBL to which the terminal UE is attached by the link L1.

The station SBL, having received the request m06 asking it to establish a new connection C2 for the terminal UE, decides not to establish it, because it does not have the necessary resources indicated, for example because it does not have sufficient bandwidth between itself and the packet switching network PSN to carry the traffic generated by the new connection C2, which would be added to the traffic generated by the existing connections, including the connection C1.

The station SBL then transmits, on the one hand, a response "Bearer Setup Delegated" m07 to the server MME with the indication that the resources are insufficient on the station SBL to process the request of the server MME and that the station has decided to delegate to another station SBV the handling the request, and on the other hand, a request "Connection Reconfiguration" m08 destined for the terminal UE.

According to the prior art, the station SBL would have transmitted a response "Bearer Setup Fail" instead of a response "Bearer Setup Delegated". The advantage of the "Bearer Setup Delegated" response is that it allows the server MME to place itself on standby awaiting a petition on the part of a neighbor station to the station SBL. This "Bearer Setup Delegated" response is however not compulsory, and in a variant, it might not be transmitted, knowing that the server MME remains on standby awaiting a response from the station SBL, which anyway comes in the form of the message m16 presented below.

Through the request m08, the terminal UE is asked to attach to the station SBV, previously selected by the station SBL, with a view to establishing the new connection C2 through the station SBV, while maintaining the connection C1 active, the two connections C1 and C2 sharing the same IP address.

For example the request m08 comprises the following parameters:

identifier of the first connection C1,
identifier of the station SBV,
bandwidth required for the new connection.

In answer to the message m08, the terminal UE transmits a request "Connection Request" m09 to the station SBV, intended to establish a link at the level of the physical layer, for example a radioelectric link, with the station SBV.

The station SBV responds to the terminal UE by a response "Connection Setup" m10, indicating to the terminal that the link is established.

The terminal UE then transmits an attachment request "Connection Setup Complete/Attach Request" m11 to the station SBV, which must verify that it has sufficient bandwidth to the packet switching network PSN. For this purpose, the message m11 indicates in particular the bandwidth required for the new connection. If it does not have it, the station SBV responds to the message m11 by a message "Attach Reject" indicating as cause of rejection the lack of resources to meet the bandwidth demand.

Thereafter, the station SBV must verify that attachment is possible by transmitting to the server MME a request "Attach Request" m12. For this purpose, the message m11 indicates in particular the identity of the server MME with which the terminal UE had previously conversed to establish the initial connection C1. If the station SBV cannot contact the designated server MME since the latter does not form part of the list (MME pool) of servers MME that it has the right to contact, the station SBV responds to the message m11 by a message "Attach Reject" indicating as cause of rejection the impossibility of contacting the server MME.

There follows an exchange of messages m13 between the server MME and the terminal UE, intended to identify and authenticate the terminal UE. During this exchange, the server MME can verify with an authorization server HSS (Home Subscriber Server) whether "multihoming", that is to say the possibility of attaching to several base stations at one and the same time, is authorized for the terminal UE. Certain parts of this exchange that relate strictly to the identification and to the authentication of the terminal UE may have already been carried out during the establishment of the connection C1, and are optional.

If "multihoming" is not authorized, then the server MME must dispatch an error message "Attach Reject" to the station SBV indicating as cause of rejection the absence of permission to establish a new connection through the station SBV for the terminal UE. The station SBV must then relay the error message "Attach Reject" to the terminal UE.

In the three cases of rejection, the terminal UE and the station SBV must then interrupt their physical layer level link. Hereinafter, it will be assumed that none of these causes of rejection is realized.

There follows an exchange of messages m14 between the server MME and the station SBV, and between the station SBV and the terminal UE. This exchange m14 comprises messages such as, for example, a message "Attach Accept/Context Setup Request" from the server MME to the station SBV, in response to the request m12, a request "Connection Reconfiguration Request" from the station SBV to the terminal UE and to which it responds by a message "Connection Reconfiguration Response", thus allowing the station SBV to respond to the server MME by a message "Context Setup Response", and then by a message "Attach Complete".

On completion of this exchange m14, the terminal UE has the parameters necessary for the new connection C2, such as:

scheme and parameters for enciphering the data traveling in the connection C2 on the segment between the terminal UE and the station SBV, reminder of the parameters of the already established connection C1 between the terminal UE and the anchor gateway PGW, such as for example the identifier of the connection C1, as well as the IP address allotted to the terminal UE for this connection C1, characteristics of the IP streams to be made to pass in the upgoing direction in the connection C2, in the form of one or more descriptions TFT (Traffic Flow Template) describing the address or the ranges of destination IP addresses, port or range of source TCP/UDP and/or destination ports as well as DSCP field of the IP packets transported (it will be noted that all or some of these parameters will be able to be supplied).

Subsequent to the exchange m14, the terminal UE can transmit first data on the connection C2 in the upgoing direction, toward the network PSN. The connection C2 is denoted "C2/uplink" in the figure. The connection C2 being associated with the connection C1, the IP packets transmitted by the terminal UE in the upgoing direction of this connection C2 contain the same source IP address as those transmitted in the upgoing direction of the already existing connection C1.

Subsequent to the exchange m14, the terminal UE transmits destined for the station SBL, in response to the request m08, a message "Connection Reconfiguration Complete" m15. This message differs from the standard in that the terminal UE informs the station SBL of the proper establishment of the connection C2 through the station SBV, whose base station identifier it recalls.

The station SBL thereafter transmits destined for the server MME, in response to the request m06, a message "Session Management Response" m16. This message differs from the standard in that the station SBL informs the server MME that the station SBL has been made aware by the terminal UE of the proper establishment of the connection C2 through the station SBV, whose base station identifier it recalls.

Thereafter, responses m17, m18, m19 and m20 are made in cascade respectively to the requests m05, m04, m03 and m02, in compliance with the standard.

Subsequent to this cascade of responses, the anchor gateway PGW is correctly configured to steer toward the connection C2 in the downgoing direction the IP packets eligible for the connection C2, and the terminal UE can receive first data on the connection C2 in the downgoing direction, from the network PSN. The connection C2 is denoted "C2/downlink" in FIG. 2.

It will be noted that the characteristics of the IP streams to be made to pass in the downgoing direction in the connection C2, correspond to one or more TFT descriptions indicated in the initial message "IP CAN Session Modification" m03 originating from the PCRF.

In conjunction with FIG. 3, an exemplary structure of a local base station according to one aspect of the invention is now presented.

The local base station SBL implements the method for delegating a request to establish a new connection, various embodiments of which have just been described.

Such a station SBL can be implemented in a hybrid residential gateway PRHL such as that presented in conjunction with FIGS. 1*c* and 1*d*.

For example, the station SBL comprises a processing unit 130, equipped for example with a microprocessor μP, and driven by a computer program 110, stored in a memory 120 and implementing the method for delegating a request to establish a new connection according to the invention. On initialization, the code instructions of the computer program 110 are for example loaded into a RAM memory, before being executed by the processor of the processing unit 130.

Such a station SBL also comprises a receiver 140, and a transmitter 150:
- the receiver 140 being able to obtain measurements of quality m01 of a radio signal transmitted by at least one neighbor base station toward the cellular terminal,
- able to receive a request for establishment m06 of a new connection between the cellular terminal and the anchor gateway, generated by the anchor gateway and comprising an indication of necessary resources,
- and able to receive a response message m15 originating from the cellular terminal confirming the establishment of the new connection through a neighbor base station,
- the processor 130 being able to decide not to establish the new connection through the apparatus, on the basis of the indication of necessary resources,
- and able to select a neighbor base station as a function of the quality measurements obtained,
- the transmitter 150 being able to transmit a response message m07 indicating that the establishment of the new connection is delegated to the selected neighbor base station,
- and able to transmit a configuration message m08 destined for the cellular terminal comprising an identifier of the selected neighbor base station, the configuration message requesting the attachment of the cellular terminal to the selected neighbor base station, by a second link, the attachment triggering the creation of the new connection between the cellular terminal and the anchor gateway through the selected neighbor base station, the new connection using the IP address and the second link, the first connection and the first link being maintained.

In conjunction with FIG. 4, an exemplary structure of a cellular terminal according to one aspect of the invention is now presented.

The cellular terminal UE implements the method for processing the delegated request to establish a new connection, various embodiments of which have just been described.

Such a terminal UE can be implemented in a hybrid residential gateway PRHL such as that presented in conjunction with FIGS. 1c and 1d.

For example, the terminal UE comprises a processing unit 230, equipped for example with a microprocessor μP, and driven by a computer program 210, stored in a memory 220 and implementing the method for processing the delegated request to establish a new connection according to the invention. On initialization, the code instructions of the computer program 210 are for example loaded into a RAM memory, before being executed by the processor of the processing unit 230.

Such a terminal UE also comprises a transmitter 240, and a receiver 250:
- the transmitter 240 being able to transmit destined for the local base station of measurements of quality (m01) of a radio signal transmitted by at least one neighbor base station toward the cellular terminal,
- the receiver 250 being able to receive a configuration message (m08) comprising an identifier of one of the at least one neighbor base station, the configuration message requesting the attachment of the cellular terminal to the neighbor base station, by a second link (L2), the attachment triggering the creation of the new connection between the cellular terminal and the anchor gateway through the neighbor base station, the new connection using the IP address and the second link, the first connection and the first link being maintained,
- the transmitter 240 being able to transmit destined for the local base station of a response message (m15) comprising an information item relating to the establishment of the new connection through the neighbor base station, comprising the identifier of the neighbor base station.

The local base station SBL and the cellular terminal UE may be implemented in a hybrid residential gateway PRHL. In this configuration certain elements like the processor, the receiver or the transmitter may be common.

The invention claimed is:

1. A method for delegating a request to establish a new data connection between a terminal adapted to connect to a cellular network, so-called cellular terminal, and a so-called anchor gateway comprising an interface with a packet switching network,
    the cellular terminal being attached by a first link to a local base station,
    a first data connection being established between the cellular terminal and the anchor gateway, an IP address being allocated to the cellular terminal by the anchor gateway,
    the first data connection using the IP address and the first link,
    the method being implemented in the local base station and comprising the following acts:
        obtaining of measurements of quality of a radio signal transmitted by at least one neighbor base station toward the cellular terminal,
        reception of a request for establishment of a new data connection between the cellular terminal and the anchor gateway, generated by the anchor gateway and comprising an indication of necessary resources,
        decision not to establish the new data connection through the local base station, on the basis of the indication of necessary resources,
    the method furthermore comprising the following acts:
        selection of a neighbor base station as a function of the quality measurements obtained,
        transmission of a configuration message destined for the cellular terminal comprising an identifier of the selected neighbor base station, the configuration message requesting the attachment of the cellular terminal to the selected neighbor base station, by a second link, the attachment triggering the creation of the new data connection between the cellular terminal and the anchor gateway through the selected neighbor base station, the new data connection using the IP address and the second link to exchange data packets of a data stream, the first data connection and the first link being maintained.

2. The delegation method as claimed in claim 1, furthermore comprising transmitting a response message comprising an information item relating to the delegation of the establishment of the new data connection to a neighbor base station.

3. The delegation method as claimed in claim 1, furthermore comprising receiving a response message originating from the cellular terminal confirming the establishment of the new data connection through the selected neighbor base station.

4. The delegation method as claimed in claim 1, where the decision act comprises comparing a bitrate necessary for the new data connection with a bitrate available through the local base station, the indication of necessary resources, which is included in the request for establishment of the new data connection, comprising an information item relating to the necessary bitrate.

5. The delegation method as claimed in claim 1, where the configuration message comprises the indication of necessary resources.

6. The delegation method as claimed in claim 1, where the first link is a radio link emulated on a physical hookup between the cellular terminal and the local base station.

7. The delegation method as claimed in claim 6, where the local base station is connected to a broad-band fixed access network.

8. The delegation method as claimed in claim 7, where the cellular terminal is able to connect to terminal devices forming a local access network, the devices of the local access network being able to exchange data packets with devices of the packet switching network, through the first link and through the second link.

9. A method for processing a delegated request to establish a new data connection between a terminal adapted to connect to a cellular network, so-called cellular terminal, and a so-called anchor gateway comprising an interface with a packet switching network,
the cellular terminal being attached by a first link to a local base station,
a first data connection being established between the cellular terminal and the anchor gateway, an IP address being allocated to the cellular terminal by the anchor gateway,
the first data connection using the IP address and the first link,
the method being implemented in the cellular terminal and comprising the following acts:
transmission destined for the local base station of measurements of quality of a radio signal transmitted by at least one neighbor base station toward the cellular terminal,
reception of a configuration message comprising an identifier of one of the at least one neighbor base station, the configuration message requesting the attachment of the cellular terminal to the neighbor base station, by a second link, the attachment triggering the creation of the new data connection between the cellular terminal and the anchor gateway through the neighbor base station, the new data connection using the IP address and the second link to exchange data packets of a data stream, the first data connection and the first link being maintained,
transmission destined for the local base station of a response message comprising an information item relating to the establishment of the new data connection through the neighbor base station, comprising the identifier of the neighbor base station.

10. A local base station able to delegate a request to establish a new data connection between a terminal adapted to connect to a cellular network, so-called cellular terminal, and a so-called anchor gateway comprising an interface with a packet switching network,
the cellular terminal being attached by a first link to the local base station,
a first data connection being established between the cellular terminal and the anchor gateway, an IP address being allocated to the cellular terminal by the anchor gateway,
the first data connection using the IP address and the first link,
the local base station comprising a receiver, a processor and a transmitter:
the receiver being configured to obtain measurements of quality of a radio signal transmitted by at least one neighbor base station toward the cellular terminal,
and to receive a request to establish a new data connection between the cellular terminal and the anchor gateway, generated by the anchor gateway and comprising an indication of necessary resources,
the processor being configured to decide not to establish the new data connection through the local base station, on the basis of the indication of necessary resources,
and configured to select a neighbor base station as a function of the quality measurements obtained,
the transmitter being configured to transmit a configuration message destined for the cellular terminal comprising an identifier of the selected neighbor base station, the configuration message requesting the attachment of the cellular terminal to the selected neighbor base station, by a second link, the attachment triggering the creation of the new data connection between the cellular terminal and the anchor gateway through the selected neighbor base station, the new data connection using the IP address and the second link to exchange data packets of a data stream, the first data connection and the first link being maintained.

11. The local base station of claim 10, wherein the local base station is comprised in a hybrid residential gateway that further comprises the cellular terminal, which is attached to the local base station by a radioelectric link emulated on a physical hookup, the local base station being connected to a broad-band fixed access network.

12. The local base station as claimed in claim 11, where the cellular terminal is configured to connect to terminal devices forming a local access network, the devices of the local access network being able to exchange data packets with devices of the packet switching network, through the first and second links.

13. The local base station as claimed in claim 11, where the local base station is of femtocell type.

14. A cellular terminal adapted to connect to a cellular network and able to process a delegated request to establish a new data connection between the cellular terminal and a so-called anchor gateway comprising an interface with a packet switching network,
the cellular terminal being attached by a first link to a local base station,
a first data connection being established between the cellular terminal and the anchor gateway, an IP address being allocated to the cellular terminal by the anchor gateway,
the first data connection using the IP address and the first link,
the cellular terminal comprising a transmitter and a receiver:
the transmitter being configured to transmit destined for the local base station measurements of quality of a radio signal transmitted by at least one neighbor base station toward the cellular terminal, the receiver being configured to receive a configuration message comprising an identifier of one of the at least one neighbor base station, the configuration message requesting the attachment of the cellular terminal to the neighbor base station, by a second link, the attachment triggering the creation of the new data connection between the cellular terminal and the anchor gateway through the neighbor base station, the new data connection using the IP address and the second link to exchange data packets of a data stream, the first data connection and the first link being maintained, the transmitter being configured to transmit destined for the local base station a response message comprising an information item relating to the establishment of the new data connection through the neighbor base station, comprising the identifier of the neighbor base station.

15. A non-transitory computer-readable medium comprising a computer program stored thereon, which comprises instructions for implementing a method of delegating a request to establish a new data connection between a terminal adapted to connect to a cellular network, so-called cellular terminal, and a so-called anchor gateway comprising an interface with a packet switching network, when the instructions are executed by a processor of a local base station, the cellular terminal being attached by a first link to the local base station, a first data connection being established between the cellular terminal and the anchor gateway, an IP address being allocated to the cellular terminal by the anchor gateway, the first data connection using the IP address and the first link, the method being implemented in the local base station and comprising the following acts:

obtaining of measurements of quality of a radio signal transmitted by at least one neighbor base station toward the cellular terminal, reception of a request for establishment of a new data connection between the cellular terminal and the anchor gateway, generated by the anchor gateway and comprising an indication of necessary resources, decision not to establish the new data connection through the local base station, on the basis of the indication of necessary resources, the method furthermore comprising the following acts:

selection of a neighbor base station as a function of the quality measurements obtained, transmission of a configuration message destined for the cellular terminal comprising an identifier of the selected neighbor base station, the configuration message requesting the attachment of the cellular terminal to the selected neighbor base station, by a second link, the attachment triggering the creation of the new data connection between the cellular terminal and the anchor gateway through the selected neighbor base station, the new data connection using the IP address and the second link to exchange data packets of a data stream, the first data connection and the first link being maintained.

* * * * *